(12) United States Patent
Suzuki

(10) Patent No.: US 10,541,585 B2
(45) Date of Patent: Jan. 21, 2020

(54) BUILDUP DEVICE

(71) Applicant: Sankyo Seisakusho Co., Tokyo (JP)

(72) Inventor: Kengo Suzuki, Kikugawa (JP)

(73) Assignee: Sankyo Seisakusho Co., Tokyo (JP)

( * ) Notice: Subject to any disclaimer, the term of this patent is extended or adjusted under 35 U.S.C. 154(b) by 183 days.

(21) Appl. No.: 15/199,649

(22) Filed: Jun. 30, 2016

(65) Prior Publication Data

US 2017/0018993 A1    Jan. 19, 2017

(30) Foreign Application Priority Data

Jul. 13, 2015    (JP) .................................. 2015-139887

(51) Int. Cl.
*H02K 5/24*    (2006.01)
*B21D 22/08*    (2006.01)

(52) U.S. Cl.
CPC .............. *H02K 5/24* (2013.01); *B21D 22/08* (2013.01)

(58) Field of Classification Search
CPC .......... H02K 5/24; F16F 15/08; F16F 15/085; B21D 22/08; B21D 28/14; B21D 43/22; B21D 28/02; B21D 28/12
USPC ................................................... 310/51, 157
See application file for complete search history.

(56) References Cited

U.S. PATENT DOCUMENTS

| | | | | |
|---|---|---|---|---|
| 1,833,755 A * | 11/1931 | Vincent | ................... | H02K 5/24 248/605 |
| 2,216,814 A * | 10/1940 | Gray, Jr. | ................ | F16F 15/04 267/140.11 |
| 2,951,667 A * | 9/1960 | Wise | ..................... | F16F 1/3732 248/580 |
| 3,337,165 A * | 8/1967 | Kondo | .................... | F16F 7/104 188/380 |
| 6,328,274 B1 * | 12/2001 | Hayashi | .................. | F16F 15/08 248/606 |
| 6,557,816 B2 * | 5/2003 | Yoshida | ................. | B41J 19/005 248/557 |
| 2009/0120989 A1 * | 5/2009 | Kato | ...................... | B21C 47/34 226/181 |

FOREIGN PATENT DOCUMENTS

| | | | |
|---|---|---|---|
| JP | 2011020132 A | * | 2/2011 |
| JP | 2011-062732 A | | 3/2011 |
| JP | 2013-116497 A | | 6/2013 |

OTHER PUBLICATIONS

Hashidate, Machine Translation of JP2011020132, Feb. 2011.*

* cited by examiner

*Primary Examiner* — Quyen P Leung
*Assistant Examiner* — Eric Johnson
(74) *Attorney, Agent, or Firm* — Patterson + Sheridan, LLP

(57) ABSTRACT

There is provided a buildup device that builds up a plate-shaped core after rotating the core by a predetermined angle, and that includes a servomotor, a damping plate attached to the servomotor, at least one upper plate provided above the damping plate, at least one lower plate provided below the damping plate, and a plurality of vibration absorbing members attached to the damping plate. The upper plate and the lower plate restrict a degree of freedom of vibration to one direction, and the vibration absorbing members absorb vertical vibration.

7 Claims, 5 Drawing Sheets

SECTION VIEW A-A

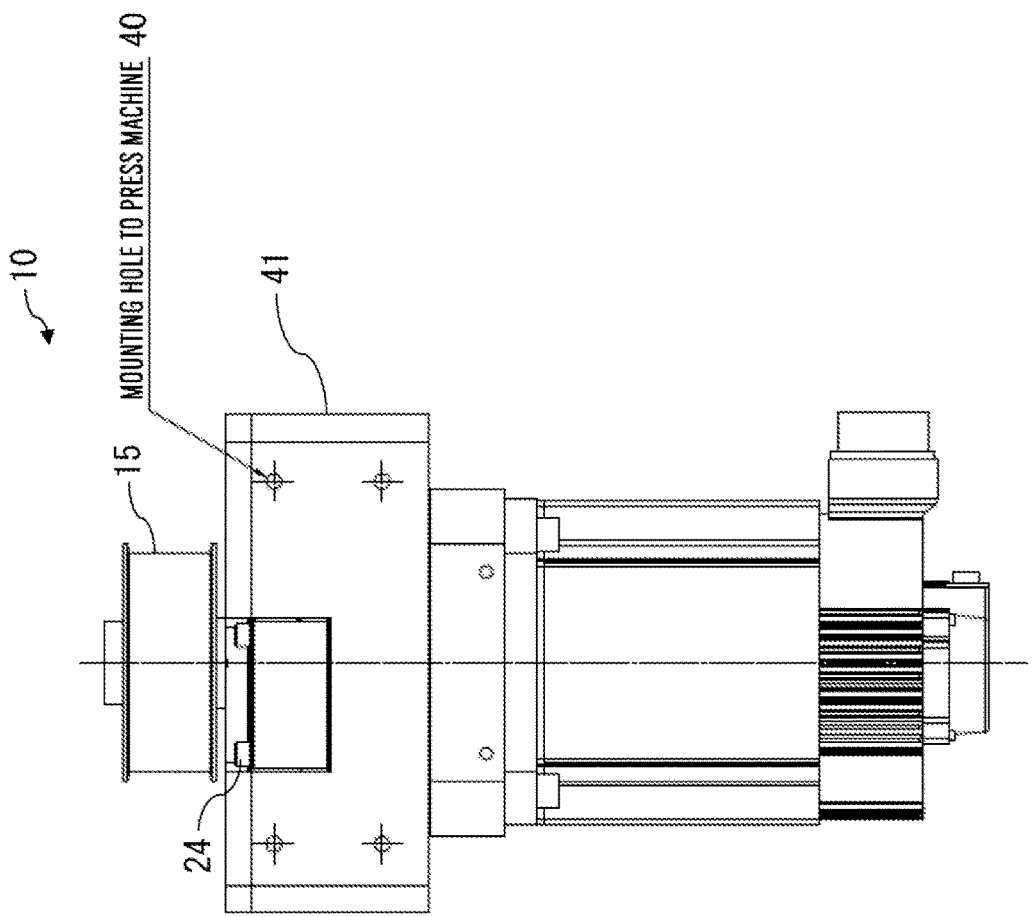
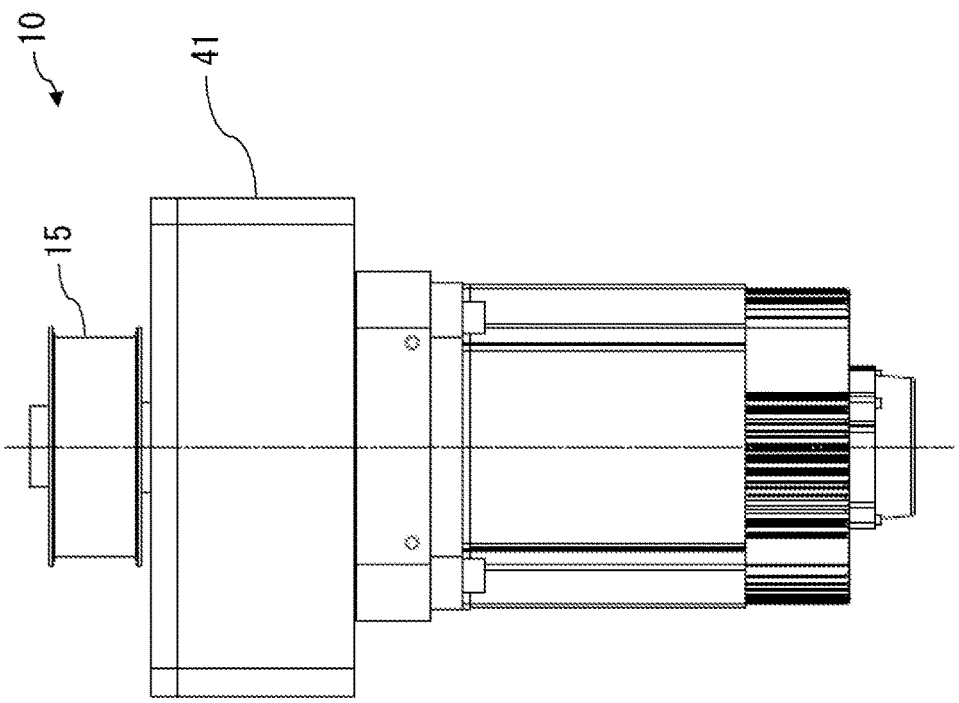

BUILDUP DEVICE

CROSS-REFERENCE TO RELATED APPLICATION

This application is based upon and claims the benefit of priority from Japanese Patent Application No. 2015-139887, filed Jul. 13, 2015, the entire contents of which are incorporated herein by reference.

BACKGROUND OF THE INVENTION

The present invention relates to a buildup device that builds up plate-shaped cores stamped out after rotating each of the cores.

In recent years, increase in demand for mass production of built-up cores has required a buildup device capable of building up cores at high speed when built-up cores are produced by building up plate-shaped cores to increase production efficiency. To achieve the buildup device capable of building up cores at high speed, JP-A-2011-62732 discloses a structure as follows: a side face of a built-up iron core is supported by an inner wall surface of a lower mold; a surface of a lowermost core of the built-up iron core is supported by a back pressure device; the inner wall surface of the lower mold is rotatably coupled to a first rotary drive device; and the back pressure device is coupled to a second rotary drive device. The structure of JP-A-2011-62732 allows the built-up iron core to be rotated by the first rotary drive device and the second rotary drive device after a punch attached to an upper mold passes through a die of the lower mold, thereby aggressively rotating the built-up iron core built up by rotation of a pressure receiving portion of the back pressure device to increase rotation speed.

However, if operation at high speed is attempted in a conventional typical buildup device by increasing rotation speed of a rotary drive device, a load is applied to a motor and other components, and thus the load may cause breakage or failure in the motor or the like. To reduce a load to be applied to a rotating and sliding portion, JP-A-2013-116497 discloses an ejection hole that is provided in a die metal holder rotatably supporting a die holder to supply compressed air to the die holder through the ejection hole to apply floating force to the die holder, thereby building up a core after rotating the core while rotation supply to the die holder is reduced.

However, in the buildup device of JP-A-2013-116497 in which compressed air is supplied to allow the die holder to smoothly rotate during building up a core after rotating the core so that frictional resistance in the rotating and sliding portion is reduced to reduce a load, there is a problem in which a load caused by the frictional resistance can be reduced, but a load applied to a motor and other components caused by vibration in operation at high speed cannot be efficiently reduced.

In this way, the conventional buildup device has a problem in which if a rotary drive unit is attempted to be rotated at high speed, a load caused by vibration increases, and if the load caused by vibration is attempted to be reduced, rotation speed of the rotary drive unit needs to be reduced. Thus, there is required a buildup device capable of reducing a load caused by vibration, to be applied to a motor and the like, while achieving high speed rotation of the rotary drive unit.

The present invention solves the problem above and provides a buildup device that has a less load applied to other components such as a motor, and that is capable of laminating plate-shaped cores at high speed.

SUMMARY OF THE INVENTION

To solve the problem above, the present invention provides a buildup device that builds up a plate-shaped core after rotating the core by a predetermined angle, and that includes an upper plate and a lower plate to restrict vibration from a press machine.

A buildup device in accordance with one aspect of the present invention builds up a plate-shaped core after rotating the core by a predetermined angle, and includes a servomotor, a damping plate attached to the servomotor, at least one upper plate provided above the damping plate, at least one lower plate provided below the damping plate, and a plurality of vibration absorbing members attached to the damping plate. The upper plate and the lower plate restrict a degree of freedom of vibration to one direction, and the vibration absorbing members absorb vertical vibration.

In the buildup device in accordance with the one aspect of the present invention, the plurality of vibration absorbing members includes absorbing members attached to an upper surface of the damping plate, and absorbing members attached to a lower surface of the damping plate. In a buildup device in accordance with another aspect of the present invention, the plurality of vibration absorbing members may be attached to any one of the upper surface and the lower surface of the damping plate.

In the buildup device in accordance with the one aspect of the present invention, the plurality of vibration absorbing members attached to the upper surface of the damping plate are attached to respective predetermined places on the upper surface of the damping plate. In the buildup device in accordance with another aspect of the present invention, the plurality of vibration absorbing members each attached to the upper surface of the damping plate may be attached to a position displaced clockwise from diagonal lines between four corners or of four predetermined points on the damping plate. In a buildup device in accordance with yet another aspect of the present invention, the plurality of vibration absorbing members each attached to the upper surface of the damping plate may be attached to a position displaced counterclockwise from the diagonal lines between the four corners on the damping plate.

In the buildup device in accordance with the one aspect of the present invention, the plurality of vibration absorbing members attached to the lower surface of the damping plate are attached to respective predetermined places on the lower surface of the damping plate. In the buildup device in accordance with another aspect of the present invention, the plurality of vibration absorbing members attached to the lower surface of the damping plate may be attached to the four corners or four predetermined points on the damping plate. In the buildup device in accordance with another aspect of the present invention, the plurality of vibration absorbing members each attached to the lower surface of the damping plate may be attached to a predetermined position in an outer periphery of the damping plate.

In the buildup device in accordance with the one aspect of the present invention, end portions of the upper plate may be coupled to respective end portions the lower plate with bolts. In the buildup device in accordance with another aspect of the present invention, the four corners or predetermined points on the upper plate may be coupled to the corresponding four corners or predetermined points on the lower plate with respective bolts.

In the buildup device in accordance with the one aspect of the present invention, the vibration absorbing member is a rubber insulator. In the buildup device in accordance with another aspect of the present invention, a spring or a damper may be used as the vibration absorbing member.

The buildup device in accordance with the one aspect of the present invention further includes a timing pulley attached to an output shaft fastened to a shaft of the servomotor. The timing pulley may be coupled to a timing pulley of a buildup mold through a transfer member such as a belt.

(Technical Advantage)

The present invention efficiently achieves effect of reducing vibration from a press machine that may cause breakage and failure in a motor. It can be expected that preventing breakage and failure in the motor caused by the vibration extends the life of the motor as well as of the entire buildup device, and by extension extends the life of a buildup mold coupled to the buildup device as well as that of a press machine coupled thereto, thereby leading to reduction in costs at a production site.

The buildup device in accordance with the present invention is also capable of building up plate-shaped cores with high accuracy by reducing the vibration from the press machine. When the plate-shaped cores each stamped out by the press machine are built up after rotating each of the cores, it is possible to prevent the motor providing rotary drive force from being affected by the vibration from the press machine, and thus motion of the motor is stabilized to enable the plate-shaped cores to be built up after rotating each of the cores with high accuracy. In this way, the buildup device can be operated at high speed while maintaining high accuracy, and thus is suitable for manufacturing cores by building up the cores after rotating each of the cores.

The following description of an embodiment of the present invention, related to accompanying drawings, will reveal other objects, features, and advantages of the present invention.

BRIEF DESCRIPTION OF THE DRAWINGS

FIG. 6A is a rear view of the buildup device in accordance with the present invention; and FIG. 6B is a side view of the buildup device in accordance with the present invention.

DESCRIPTION OF THE EMBODIMENTS

Figure 1:
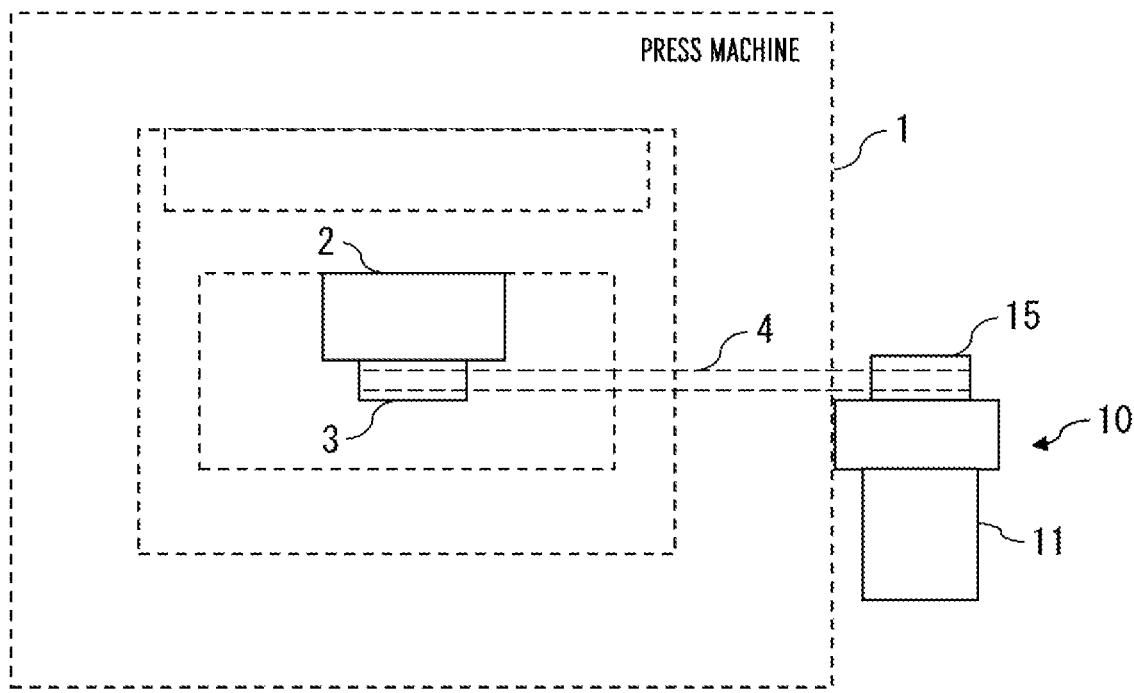
FIG. 1 is a schematic diagram of a press machine to which a buildup device in accordance with the present invention is attached.

FIG. 1 is a schematic diagram of a press machine to which a buildup device in accordance with the present invention is attached. A buildup device 10 in accordance with the present invention can be attached to a press machine 1 that stamps out a plate-shaped core of a steel plate or the like, and is used to build up the plate-shaped core stamped out by the press machine 1 after rotating the core. Thickness of the plate-shaped core stamped out is not uniform, and thus building up a plurality of plate-shaped cores causes an upper surface of the built-up cores to incline. To prevent this inclination of the built-up cores, the plate-shaped core stamped out is built up after rotated by a predetermined angle. The buildup device 10 in accordance with the present invention transfers power to a buildup mold 2 attached to the press machine to rotate the plate-shaped core by the predetermined angle. When the press machine 1 stamps out the plate-shaped core, vibration occurs. The buildup device in accordance with the present invention has a mechanism of reducing the vibration from the press machine 1. Each component of the buildup device in accordance with the present invention, including the mechanism of reducing the vibration, will be described below.

Figure 2:
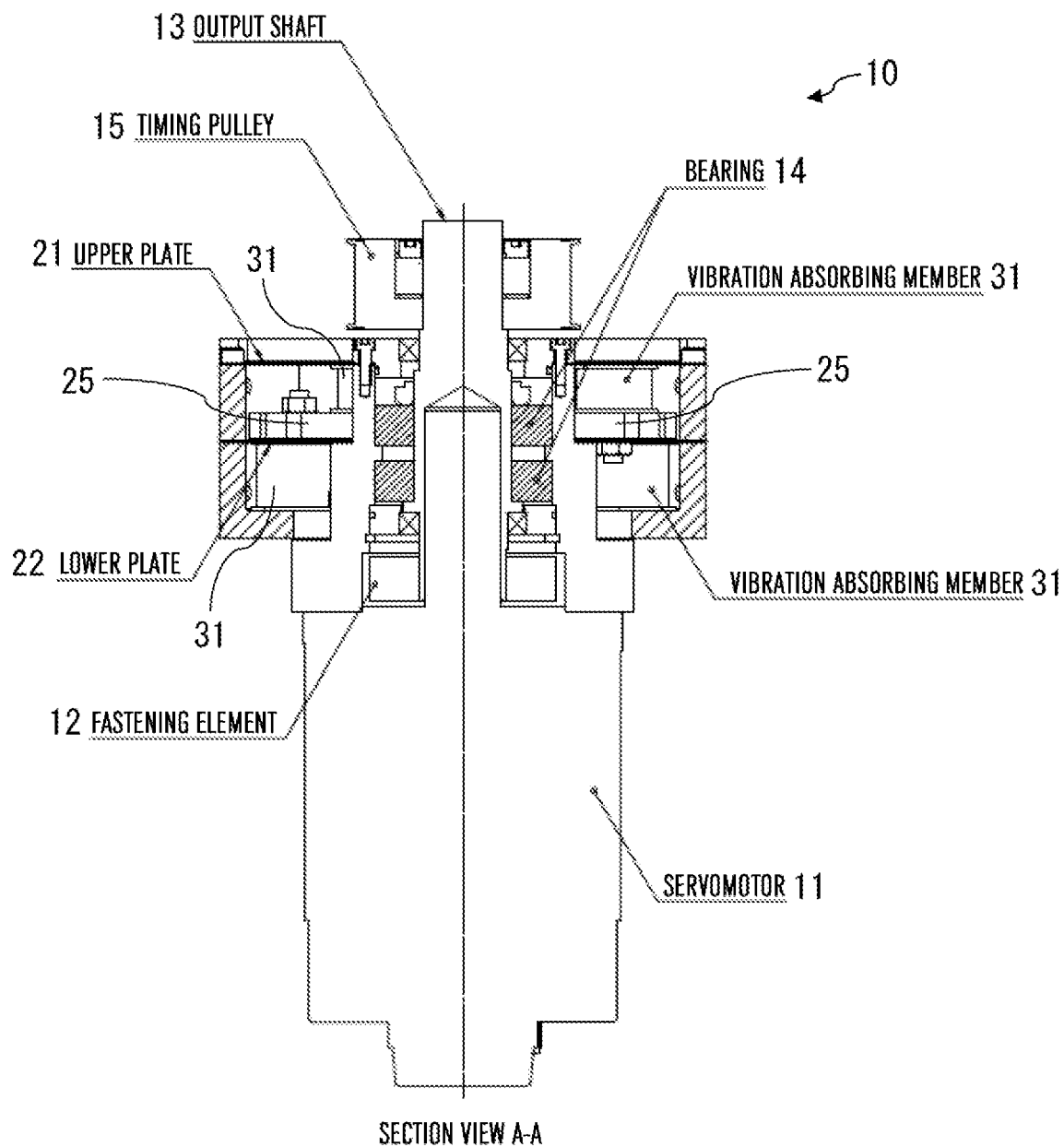
FIG. 2 is a sectional view of the buildup device in accordance with the present invention.

FIG. 2 is a sectional view of the buildup device in accordance with the present invention. The buildup device 10 in accordance with the present invention includes a servomotor 11, a damping plate 25 attached to the servomotor 11, an upper plate 21 provided above the damping plate 25, a lower plate 22 provided below the damping plate 25, and a plurality of vibration absorbing members 31 attached to the damping plate 25. The buildup device 10 also includes a fastening element 12, an output shaft 13 fastened to a shaft of the servomotor 11, at least one bearing 14 provided around the output shaft 13, and a timing pulley 15 attached to the output shaft 13. Particularly in the components above in the buildup device 10, the damping plate 25, upper plate 21, lower plate 22, and vibration absorbing members 31 reduce vibration from the press machine 1.

The servomotor 11 generates power for rotary drive. The output shaft 13 is fastened to the shaft of the servomotor 11, and thus the servomotor 11 transfers power to the buildup mold 2 through the output shaft 13 and the timing pulley 15 joined to the output shaft 13.

The output shaft 13 is joined to the servomotor 11, and is rotatably supported by the plurality of bearings 14. The output shaft 13 transfers power of the servomotor 11 to the timing pulley 15.

The at least one bearing 14 is provided adjacent to the output shaft 13 to support the output shaft 13. Typically, a plurality of bearings 14 are provided.

The timing pulley 15 of the buildup device 10 is coupled to a timing pulley 3 provided in the buildup mold 2 of FIG. 1 through a transfer member 4, and transfers power of the buildup device 10 to the buildup mold 2 through the transfer member 4. While the transfer member 4 is typically a belt, besides this a member capable of transferring power is available.

The damping plate 25 is provided with a plurality of vibration absorbing members 31 on its upper surface and lower surface. The damping plate 25 is also provided between the upper plate 21 and the lower plate 22. The vibration absorbing members 31 are capable of exerting a damping function in conjunction with the upper plate 21 and the lower plate 22. While the plurality of vibration absorbing members 31 are typically provided on both of the upper surface and lower surface of the damping plate 25, besides this the plurality of vibration absorbing members 31 may be attached to any one of the upper surface and lower surface of the damping plate 25. Each of the vibration absorbing members 31 is attached to the damping plate 25 with a fastener such as a bolt, for example.

The upper plate 21 is provided above the damping plate 25, or on a side close to the timing pulley 15. The buildup device 10 receives vibration in a vertical direction, side-to-side direction, and rotation direction, from the press machine 1. The upper plate 21 of the buildup device 10 restricts a degree of freedom of the vibration to one direction through the vibration absorbing members 31. In this way, the upper plate 21 has an important role in reducing vibration from the press machine 1 to prevent the servomotor 11 from breaking or failing due to the vibration received from the press machine 1. While the buildup device 10 typically includes one upper plate 21, two or more upper plates 21 may be provided.

The lower plate 22 of the buildup device 10 also, as with the upper plate 21, restricts a degree of freedom of the vibration from the press machine 1 to one direction through the vibration absorbing members 31. The lower plate 22 also, as with the upper plate 21, has an important role in reducing vibration from the press machine 1 to prevent the servomotor 11 from breaking or failing due to the vibration received from the press machine 1. The lower plate 22 is provided below the damping plate 25, or on a side close to the servomotor 11. While the buildup device 10 typically includes one lower plate 22, two or more lower plates 22 may be provided.

The vibration absorbing members 31 absorb vertical vibration in the vibration from the press machine 1 in the vertical direction. The vibration absorbing members 31 also restrict vibration in the rotation direction of a floating portion, caused by inertial energy generated when the mold is intermittently rotated. In this way, the vibration absorbing members 31, in conjunction with the upper plate 21 and the lower plate 22, have an important role in reducing vibration from the press machine 1 to prevent the servomotor 11 from breaking or failing due to the vibration received from the press machine 1. While each of the vibration absorbing members 31 is typically a rubber insulator, besides this an elastic body absorbing vibration and other vibration isolation members may be available.

Figure 3:
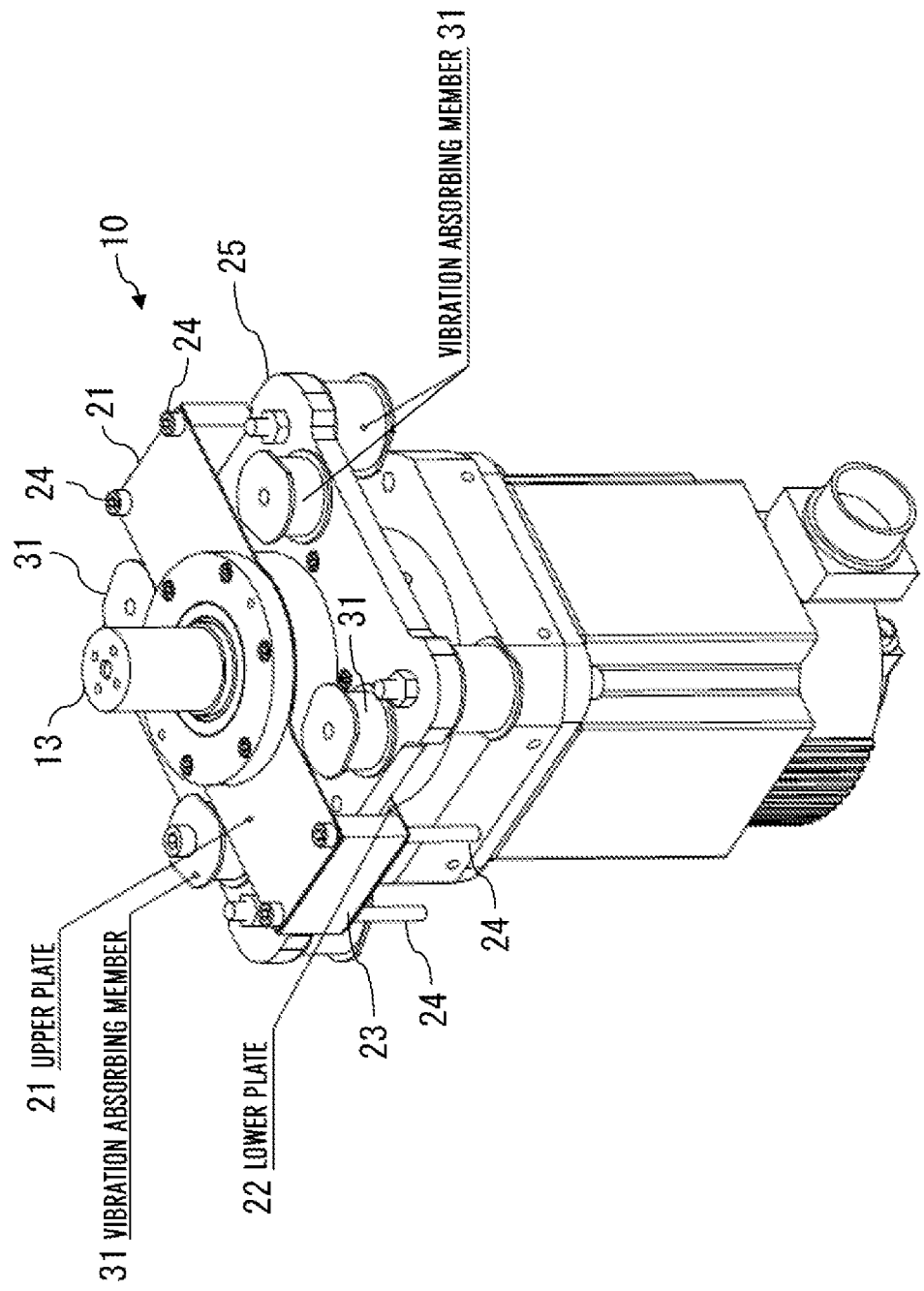
FIG. 3 is a perspective view of the buildup device in accordance with the present invention.

FIG. 3 is a perspective view of the buildup device 10 of FIG. 2 in accordance with the present invention as viewed from an oblique upward direction. The upper plate 21 and the lower plate 22 are provided with holes at their respective four corners for inserting a bolt, and are coupled to each other at their respective ends with bolts 24 inserted into the corresponding holes at the respective four corners, and coupling plates 23 provided between the upper plate 21 and the lower plate 22. Typically, the upper plate 21 and the lower plate 22 are coupled to each other at their respective right and left ends. The holes and bolts 24 are provided at least respective four corners of the upper plate 21 and the lower plate 22, but may be provided at places other than the four corners of each of the upper plate 21 and the lower plate 22. The holes and the bolts 24 are also typically provided at least two or more places in each of the upper plate 21 and the lower plate 22, but may be provided at four or more places.

The damping plate 25 is provided between the upper plate 21 and the lower plate 22. The damping plate 25 is typically provided so as to be brought into to contact with the lower plate 22, but is not limited to this. The damping plate 25 may be provided at a position closer to the lower plate 22 than the upper plate 21 in a space between the upper plate 21 and the lower plate 22. The damping plate 25 also may be provided so as to be brought into to contact with the upper plate 21, or may be provided at a position closer to the upper plate 21 than the lower plate 22 in the space between the upper plate 21 and the lower plate 22.

The vibration absorbing members 31 are typically provided below the respective four corners of the damping plate 25. The vibration absorbing members 31 are fixed to the damping plate 25 with bolts 33 inserted into the corresponding holes 32 provided at the respective four corners of the damping plate 25. The vibration absorbing members attached to the lower surface of the damping plate are attached to the respective four corners of the damping plate, but are not limited to this, and thus may be provided at respective predetermined positions in an outer periphery of the damping plate. The vibration absorbing members 31 are also provided on the damping plate 25. Typically, each of the vibration absorbing members 31 is provided at a position displaced clockwise from diagonal lines between the four corners of the damping plate 25 as viewed from above, but the position is not limited to this, and thus may be provided at a position displaced counterclockwise from the diagonal lines between the four corners of the damping plate 25, on one of the diagonal lines, or a position other than that on one of the diagonal lines.

Figure 4:
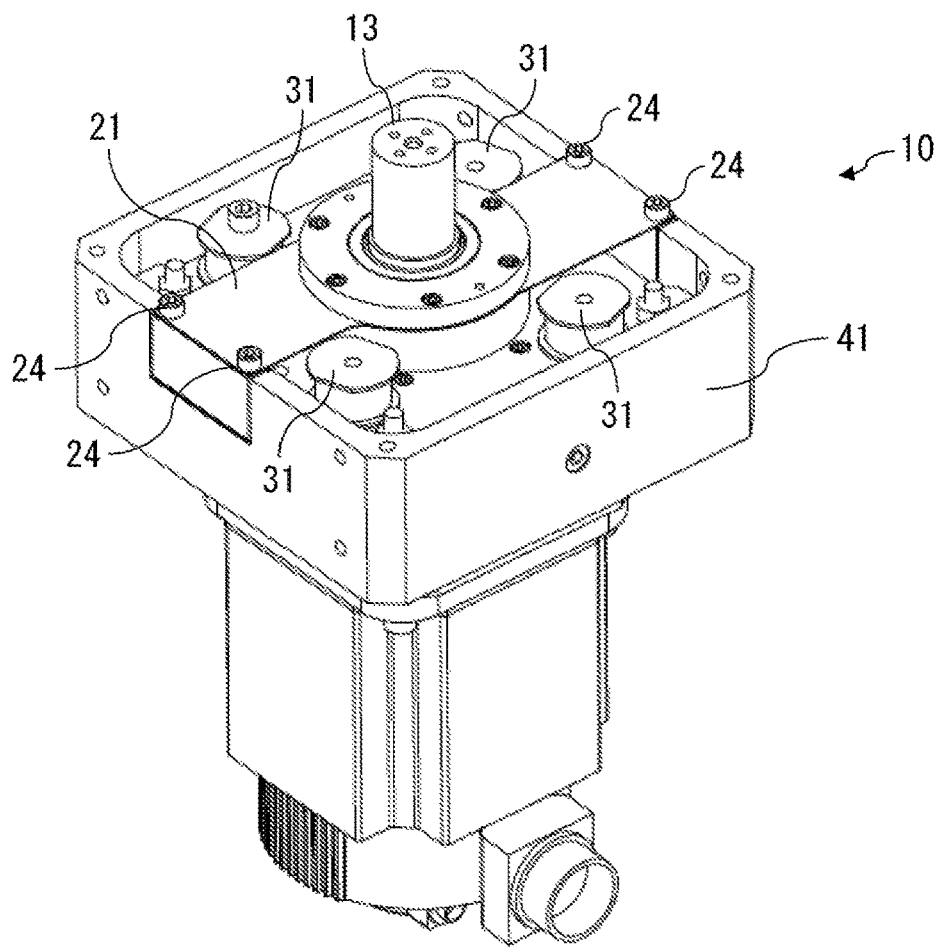
FIG. 4 is a perspective view of the buildup device in accordance with the present invention.

FIG. 4 is a perspective view of the buildup device 10 of FIG. 2 in accordance with the present invention as viewed from an oblique upward direction, and shows a state where a housing 41 is attached to surround outside the damping plate 25. In this case, the upper plate 21 is fixed to a thickness portion at an upper end of the housing 41 with the bolts 24 inserted into the corresponding holes at respective four corners of the upper plate 21. The housing 41 reduces vibration from the press machine 1 as a whole through the upper plate 21 and the lower plate 22 that restrict a degree of freedom of vibration from the press machine 1 to one direction, and the vibration absorbing members 31 that restrict vibration in the rotation direction of a floating portion, caused by inertial energy generated when the mold is intermittently rotated. Accordingly, it is possible to prevent the servomotor from breaking or failing due to vibration received from the press machine 1.

Figure 5:
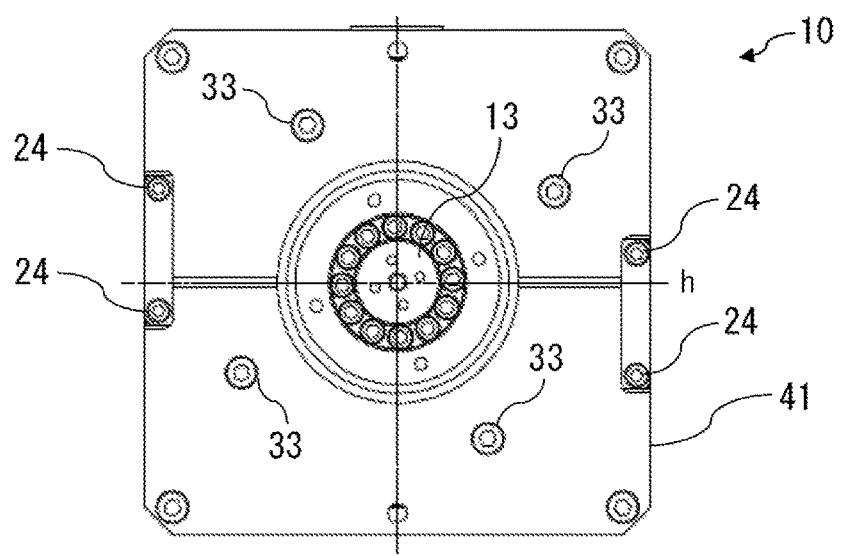
FIG. 5 is a top view of the buildup device in accordance with the present invention.

FIG. 5 is a top view of the buildup device 10 of FIG. 4 in accordance with the present invention as viewed from above, and shows a state where an upper lid is attached on an upper portion of the housing 41 of FIG. 4. There are shown the bolts 33 that fix the respective vibration absorbing members 31 provided at the corresponding positions displaced clockwise from the diagonal lines between the four corners of the damping plate 25. There are also shown the bolts 24 that are provided at the respective four corners of the upper plate 21. As it is apparent from a position of each of the bolts 24 in FIG. 5, the upper plate 21 is provided at a position to be left-right asymmetry across a horizontal line "h" passing through the output shaft 13, as viewed from above the buildup device 10. Typically, the upper plate 21 is provided at a position displaced clockwise from the horizontal line "h".

FIG. 6A is a rear view of the buildup device 10 of FIG. 4 in accordance with the present invention, and FIG. 6B is a side view of the buildup device 10 of FIG. 4 in accordance with the present invention. The buildup device 10 can be attached to the press machine 1 through mounting holes 51 to the press machine 1. In this way, the buildup device 10 can be easily attached to various kinds of press machine 1, and thus has a multiplicity of uses.

As described above, the buildup device 10 in accordance with the present invention allows the upper plate 21 and the lower plate 22 to restrict a degree of freedom of vibration from the press machine 1 to one direction through the vibration absorbing members 31, as well as the vibration absorbing members 31 to restrict vibration in the rotation direction of a floating portion, caused by inertial energy generated when the mold is intermittently rotated, thereby enabling the vibration from the press machine 1 to be reduced to prevent the motor from breaking or failing due to the vibration. Accordingly, it can be expected to extend the life of the motor as well as of the buildup device, and by extension to extend the life of the buildup mold coupled to the buildup device as well as of the press machine coupled thereto, thereby contributing to reduction in costs at a production site. The buildup device in accordance with the present invention also can be operated at high speed while maintaining high accuracy, and thus is suitable for manufacturing cores by building up the cores after rotating each of the cores, or the like.

While an embodiment is described above, the present invention is not limited to this embodiment, and thus it is obvious to a person skilled in the art that a variety of alterations and modifications that fall within the spirit and scope of the appended claims of the present invention can be made.

REFERENCE SIGNS LIST 1 press machine
2 buildup mold
3 timing pulley
4 transfer member
10 buildup device
11 servomotor
12 fastening element
13 output shaft
14 bearing
15 timing pulley
21 upper plate
22 lower plate
23 coupling plate
24 bolt
25 damping plate
31 vibration absorbing member
32 hole
33 bolt
41 housing
51 mounting hole

The invention claimed is:

1. A buildup device that builds up a plate-shaped core after rotating the core by a predetermined angle, the buildup device comprising:
a servomotor;
a damping plate attached to the servomotor;
at least one upper plate provided above the damping plate;
at least one lower plate provided below the damping plate; and
a plurality of vibration absorbing members attached to the damping plate,
the buildup device is connected to a press machine through the upper plate and the lower plate,
wherein the upper plate and the lower plate restrict a degree of freedom of vibration to one direction, and the vibration absorbing members absorb vertical vibration from the press machine and restrict vibration in the rotation direction of a floating portion of the buildup device, caused by inertial energy generated when a mold is intermittently rotated.

2. The buildup device according to claim 1, wherein the plurality of vibration absorbing members includes a plurality of absorbing members attached to an upper surface of the damping plate, and absorbing members attached to a lower surface of the damping plate.

3. The buildup device according to claim 2, wherein the plurality of vibration absorbing members attached to the upper surface of the damping plate are attached to respective predetermined places on the upper surface of the damping plate.

4. The buildup device according to claim 2, wherein the plurality of vibration absorbing members attached to the lower surface of the damping plate are attached to respective predetermined places on the lower surface of the damping plate.

5. The buildup device according to claim 1, wherein end portions of the upper plate are coupled to respective end portions of the lower plate with bolts.

6. The buildup device according to claim 1, wherein each of the vibration absorbing members is a rubber insulator.

7. The buildup device according to claim 1, further comprising:
a timing pulley attached to an output shaft fixed to a shaft of the servomotor.

* * * * *